(12) United States Patent
Noll et al.

(10) Patent No.: US 8,862,833 B2
(45) Date of Patent: Oct. 14, 2014

(54) SELECTION OF STORAGE CONTAINERS FOR THIN-PARTITIONED DATA STORAGE BASED ON CRITERIA

(75) Inventors: Dietmar Noll, Mainz (DE); Christoph Reichert, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 13/415,601

(22) Filed: Mar. 8, 2012

(65) Prior Publication Data

US 2012/0173838 A1 Jul. 5, 2012

Related U.S. Application Data

(63) Continuation of application No. PCT/EP2010/064959, filed on Oct. 7, 2010.

(30) Foreign Application Priority Data

Dec. 10, 2009 (EP) .................................... 09178621

(51) Int. Cl.
G06F 3/06 (2006.01)
(52) U.S. Cl.
CPC ............ *G06F 3/0683* (2013.01); *G06F 3/0685* (2013.01)
USPC .......................................... 711/153; 711/170
(58) Field of Classification Search
CPC .............................. G06F 3/0683; G06F 3/0685

USPC ................................................... 711/153, 170
See application file for complete search history.

(56) References Cited

U.S. PATENT DOCUMENTS

| 8,219,681 | B1* | 7/2012 | Glade et al. .................... 709/226 |
| 2006/0236064 | A1* | 10/2006 | Niles et al. ..................... 711/170 |
| 2007/0233868 | A1 | 10/2007 | Tyrrell et al. | |
| 2007/0239793 | A1 | 10/2007 | Tyrrell et al. | |
| 2008/0091748 | A1* | 4/2008 | Beniyama et al. ............. 707/205 |
| 2008/0270696 | A1 | 10/2008 | Murayama et al. | |
| 2009/0300316 | A1* | 12/2009 | Shinohara et al. ............. 711/170 |
| 2010/0332401 | A1* | 12/2010 | Prahlad et al. .................. 705/80 |

\* cited by examiner

*Primary Examiner* — Than Nguyen
(74) *Attorney, Agent, or Firm* — Griffiths & Seaton PLLC

(57) ABSTRACT

Various embodiments storing volumes of data in a data storage system, including one or more data storage containers, the data storage containers being thin-provisioned to provide virtual data storage capacity which is greater than a real data storage capacity of the data storage hardware are provided. In one embodiment, by way of example only, a real data storage capacity of the data storage system for accommodating new volumes is determined. Over-allocation information relating to one or more data storage containers is determined. Extrapolated future anticipated use of one or more containers of the data storage system from historical data storage use information is determined. One or more candidate data storage containers on the basis of information from the determining the real data storage capacity, over-allocation information, and the extrapolated future anticipated use is selected. Additional system and computer program product embodiments are disclosed and provide related advantages.

12 Claims, 4 Drawing Sheets

SELECTION OF STORAGE CONTAINERS FOR THIN-PARTITIONED DATA STORAGE BASED ON CRITERIA

PRIORITY CLAIM

This application claims priority to PCT International Application No. PCT/EP2010/064959, filed Oct. 7, 2010, which is hereby incorporated by reference in its entirety, which claims priority benefit from European Patent Application No. EPO9178621.0 filed on Dec. 10, 2009.

FIELD OF THE INVENTION

The invention relates to data storage systems, for example to data storage systems involving storage volume selection in thin-provisioned data storage sub-systems. Moreover, the present invention relates to methods of storing data in systems, for example to methods of selecting containers for creation of one or more data storage volumes in data storage volume in thin-provisioned data storage sub-systems. Furthermore, the present invention relates to software products recorded on machine-readable data media, wherein the software products are executable on computing hardware for implementing these aforementioned methods.

DESCRIPTION OF THE RELATED ART

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data. Moreover, the computer system may include a complex data processing system or computing environment. A data processing system often requires computational resources or availability requirements that cannot be achieved by a single computer.

SUMMARY OF THE DESCRIBED EMBODIMENTS

It is an object of the invention to provide a data storage system, which is operable to identify optimal placement of one or more volumes of data within thin-partitioned data storage for fulfilling one or more corresponding storage capacity provisional requests. It is a further object of the invention to provide a method in a data storage system of identifying optimal placement of one or more volumes of data within thin-partitioned data storage for fulfilling one or more corresponding storage capacity provisional requests. These objectives are achieved by the features of the independent claims. The other claims, the drawings and the specification disclose advantageous embodiments of the invention.

A method of storing one or more volumes of data in a data storage system including one or more data storage containers provided by data storage hardware, the one or more data storage containers being thin-provisioned to provide virtual data storage capacity which is greater than a real data storage capacity of the data storage hardware the method includes: (a) determining a real data storage capacity of the data storage system for accommodating the one or more new volumes; (b) determining over-allocation information relating to the one or more data storage containers; (c) determining extrapolated future anticipated use of the one or more containers of the data storage system from historical data storage use information; (d) selecting one or more candidate data storage containers on the basis of information from steps (a) to (c).

Favorably, the present invention provides data storage systems which are operable to employ a more efficient method of identifying optimal placements of one or more new data volumes in response to a request for storage capacity provisioning, for example from one or more software applications executing on computing hardware. The more efficient method involves utilizing information regarding current configuration and current usage of data storage sub-systems of the data storage system for proposing one or more suitable containers for use in creating new storage volumes for storing the one or more new data volumes while being synchronized with general planning for a configuration adopted for the data storage sub-systems implementing thin-provisioning. Such utilization of information involves defining a set of policies describing intended setup for various data containers and/or from a definition of a basic container configuration itself. Such basic container configuration concerns, for example, maximum real and maximum virtual memory sizes.

According to a favorable embodiment, the method may include selecting one or more candidate containers for the one or more new volumes, based upon results from steps (a) to (c) being compared with one or more data storage thresholds and/or being compared with policy rules defining operation of the data storage system. Another favorable embodiment of the method may include:—finding one or more containers which have sufficient virtual data storage capacity for the one or more new volumes; finding one or more containers which have sufficient real data storage capacity or the one or more new volumes; finding one or more containers which are below their over-allocation capacity with regard to thin partitioning; and finding one or more containers in respect of (a) to (c) whose data storage utilization does not exceed thresholds and best practice values.

According to a further favorable embodiment, information regarding utilization of the data storage capacity of the system may be stored in persistent memory for use in selection of the one or more candidate containers for storing the one or more new volumes. A data storage system for storing one or more volumes of data, the system including one or more data storage containers provided by data storage hardware, the one or more data storage containers being thin-provisioned to provide virtual data storage capacity which is greater than a real data storage capacity of the data storage hardware, characterized in that the system includes a memory management arrangement which is operable: (a) to determine a real data storage capacity of the data storage system for accommodating the one or more new volumes; (b) to determine over-allocation information relating to the one or more data storage containers; (c) to determine extrapolated future anticipated use of the one or more containers of the data storage system from historical data storage use information; and (d) to select one or more candidate data storage containers on the basis of information from steps (a) to (c).

Expediently, the memory management arrangement may be operable to select one or more candidate containers for the one or more new volumes, based upon results from over-allocation information, and extrapolated future anticipated use being compared with one or more data storage thresholds and/or being compared with policy rules defining operation of the data storage system.

According to a favorable embodiment, the memory management arrangement may be operable: to find one or more containers which have sufficient virtual data storage capacity for the one or more new volumes; to find one or more containers which have sufficient real data storage capacity or the one or more new volumes; to find one or more containers which are below their over-allocation capacity with regard to thin partitioning; and to find one or more containers in respect of over-allocation information, and extrapolated future anticipated use whose data storage utilization does not exceed thresholds and best practice values.

Further, the system may include persistent memory for storing information regarding a utilization of the data storage capacity of the system, the information for use in selection of the one or more candidate containers for storing the one or more new volumes.

According to another aspect of the invention, a program product is proposed comprising a computer useable medium having a computer readable program, wherein the computer readable program when executed on a computer causes the computer to perform a method according to any one of the method features described above, particularly (a) determining a real data storage capacity of the data storage system for accommodating the one or more new volumes; (b) determining over-allocation information relating to the one or more data storage containers; (c) determining extrapolated future anticipated use of the one or more containers of the data storage system from historical data storage use information; (d) selecting one or more candidate data storage containers on the basis of information from steps (a) to (c).

Further, a computer program product is proposed comprising a computer useable medium including a computer readable program, wherein the computer readable program when executed on a computer causes the computer to execute a method according to any one of the method features described above, particularly (a) determining a real data storage capacity of the data storage system for accommodating the one or more new volumes; (b) determining over-allocation information relating to the one or more data storage containers (120); (c) determining extrapolated future anticipated use of the one or more containers (120) of the data storage system (100) from historical data storage use information; (d) selecting one or more candidate data storage containers on the basis of information from steps (a) to (c).

Further, a data processing system is proposed for execution of a data processing program comprising software code portions for performing a method when the program is run on the computer, wherein the method includes any one of the method features described above, particularly (a) determining a real data storage capacity of the data storage system for accommodating the one or more new volumes; (b) determining over-allocation information relating to the one or more data storage containers; (c) determining extrapolated future anticipated use of the one or more containers of the data storage system from historical data storage use information; (d) selecting one or more candidate data storage containers on the basis of information from steps (a) to (c). Further, a data processing program for execution in a data processing system comprising software code portions for performing a method when the program is run on a computer, wherein the method steps include any one of the method features described above, particularly (a) determining a real data storage capacity of the data storage system for accommodating the one or more new volumes; (b) determining over-allocation information relating to the one or more data storage containers (120); (c) determining extrapolated future anticipated use of the one or more containers (120) of the data storage system (100) from historical data storage use information; (d) selecting one or more candidate data storage containers on the basis of information from steps (a) to (c).

Advantageously, the present invention is concerned with tying together a large set of information describing data storage allocation, especially in respect of historical information about data memory capacity usage of already existing storage volumes and containers. Such tying up of data pursuant to the present invention involves extrapolating changes in capacity configuration into the future for the data storage system. In other words, the present invention is involved with a method including: (a) monitoring use of data storage capacity to create historical data describing data storage use; (b) extrapolating on the basis of this historical data future expected data storage requirements; (c) creating new volumes in containers in response to request for storage in combination with the future expected data storage requirements.

Step (c) takes into account one or more policies pertaining to operation of the storage containers, capacity limits for the storage containers and policies regarding best practice. Other constrains of priority can also optionally pertain wherein software applications controlling time-critical processes are given higher priority when requesting allocation of data storage capacity for new volumes in comparison to software applications which are non-critical and can be temporarily halted or delayed. In step (c), processing of information relating to all candidate containers allows for an optimal container for one or more new data volumes to be selected, thereby resulting in more optimized utilization of storage infrastructure and hence more effective utilization of storage capacity in the data storage system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

Figure 1:
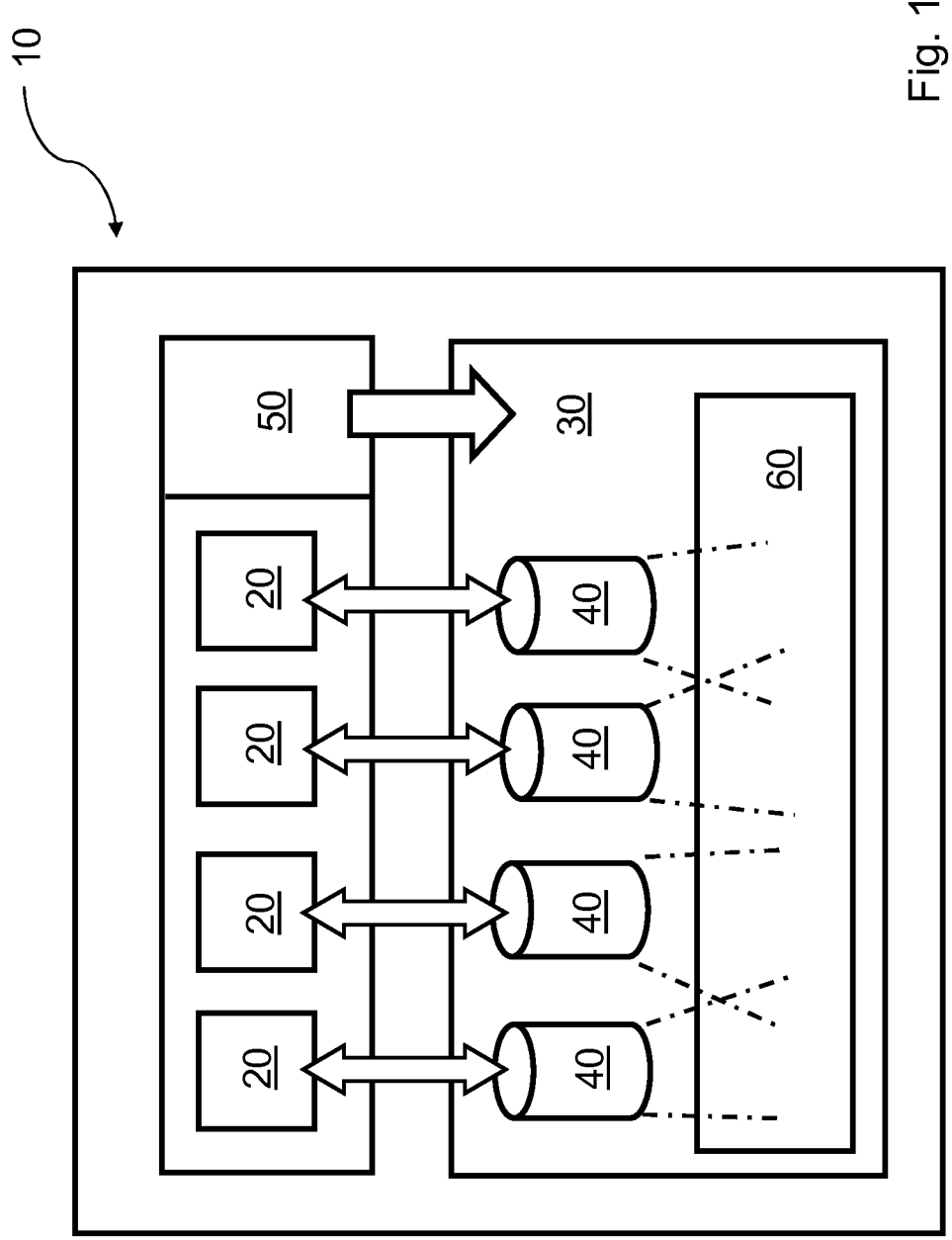
FIG. 1 shows an exemplary computer system executing computer applications having access to thin-partitioned data memory.

The detailed description explains the preferred embodiments of the invention, together with advantages and features, by way of example with reference to the drawings. In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF CERTAIN EMBODIMENTS

Referring to FIG. 1, a contemporary computing system 10 has a need for considerable data storage capacity, for example for storing large data files such as video files, sound files, signal data samples, transaction files, text database files and so forth. Moreover, it is known in the computer system 10 that several software applications 20 can be executing concurrently and have a requirement to access data memory 30, namely data storage. Conceptually, in respect of a given software application 20, it is convenient to consider its requirement for storing data to be likened to a data "container" 40. However, it has also been appreciated that concurrently executing software applications 20 do not need to use their associated data containers 40 to fullest extent simultaneously. Thus, by suitable data storage management executed by data storage management 50, it is possible for a given data storage capacity in the data memory 30 to increase the number of software applications 20 that can be supported by permitting a given real data storage hardware 60 to be shared between the data containers 40 of different software applications 20. In other words, the data storage capacity is referred to as being "thin provisioned".

Beneficially, the data storage management 50 can utilize indications communicated from the software applications 20 regarding their dynamic data storage requirements and/or monitor operation if the containers 40 and/or the real data storage hardware 60 to anticipate where data memory can be reused to serve a plurality of software applications 20. US-A-2008/0091748 discloses a capacity monitoring method utilizable in a computer system including one or more application computers, one or more storage systems, and a management computer. The storage system includes a physical disk and a disk controller. In the capacity monitoring method, a storage area of the physical disk belongs to a storage pool, the storage system provides a volume, and the management computer monitors a used capacity of the storage pool, judges whether or not a storage capacity required for operating the application computer for a predetermined time period is present in the storage pool based upon an increasing speed of the used capacity of the storage pool to be monitored, and executes a predetermined process operation when the storage capacity required for operating the application computer for the predetermined time period is not present in the storage pool. The capacity monitoring method utilizes a volume capacity history data table representing a history related to a used capacity of a thin partitioning "volume", namely data storage area, and also used capacity of applications programs. Thus, thin provisioning (TP) is concerned with an allocation of more data storage for data storage consumers, for example software applications, than is actually in practice available in a storage sub-system, for example in the real data storage hardware 60, thereby providing an ability in practice to over-allocate the storage sub-system. Contemporary implementations of thin provisioning do however have a requirement to configure a data storage container to accommodate thin-provisioned volumes, which often also involve defining maximum values for real as well as virtual storage capacity. One major challenge for storage administrators, for example the aforementioned data storage management 50, introduced as a consequence of thin partitioning is an additional level of complexity to cope with real as well as well as virtual capacities; in other words, it is necessary not only to cope with managing free and used capacity, but also to manage virtual free and virtual used data storage capacity as well as a degree of over-allocation which is utilized. In contemporary systems, it is a responsibility of a storage administrator, for example the data storage management 50, to identify best suited data storage containers, for example included within a data storage pool provided by a data storage subsystem, and also a particular storage subsystem out of a candidate list of storage subsystems to provide data storage capacity for a new volume, taking into account an existing configuration of candidate containers. Thus, appropriate container placement within a data storage system is a very complex and tedious task. Thus, the present invention provides for increased efficiency for data storage, as described below.

By way of example only, the mechanisms of the embodiments seek to provide storing volumes of data in a data storage system, including one or more data storage containers, the data storage containers being thin-provisioned to provide virtual data storage capacity which is greater than a real data storage capacity of the data storage hardware are provided. In one embodiment, by way of example only, a real data storage capacity of the data storage system for accommodating new volumes is determined. Over-allocation information relating to one or more data storage containers is determined. Extrapolated future anticipated use of one or more containers of the data storage system from historical data storage use information is determined. One or more candidate data storage containers on the basis of information from the determining the real data storage capacity, over-allocation information, and the extrapolated future anticipated use is selected.

When implementing the present invention, the following information is taken into consideration when deciding placement of one or more new data volumes and/or one or more new containers for such volumes: (i) the types of candidate containers that are available, namely for determining whether or not the candidate containers are suitable for storing one or more new volumes; (ii) current configuration limits for existing data storage containers; (iii) specific policies relating to data storage use of the containers and/or future policies to be implemented in relation thereto; (iv) a current real utilization of containers of the system for storing data volumes; (v) historical data of existing volumes stored in the containers, and also extrapolated trends from the historical data; (vi) existing volumes and volumes that would be created in response to request for storage space for one or more new volumes, for example including a measure of over-allocation utilized for each container in the data storage system.

Figure 2:
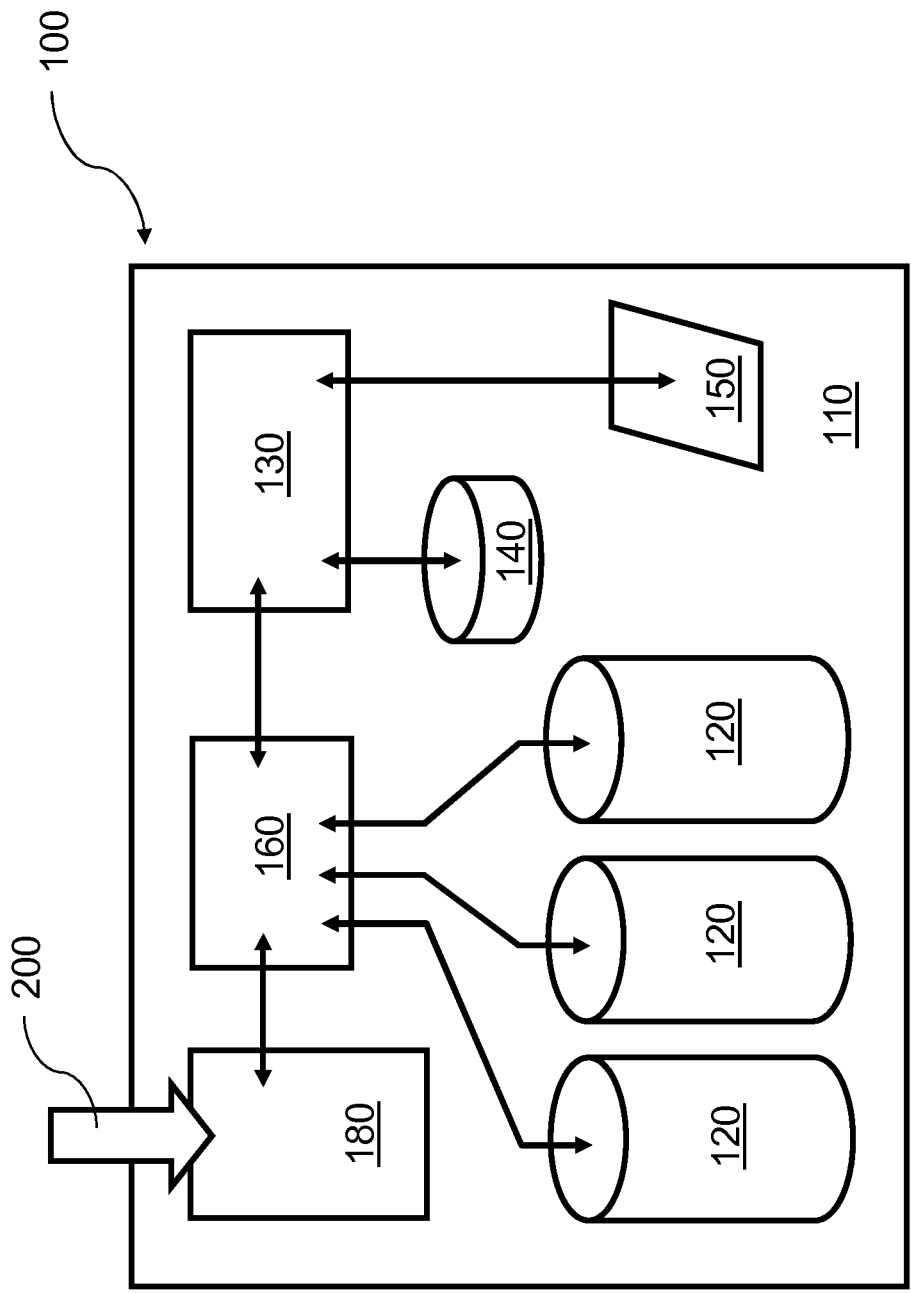
FIG. 2 illustrates an exemplary block diagram showing a data storage system implemented in which aspects of the present invention may be realized.

A practical example of implementation of the present invention will now be described with reference to FIG. 2. In FIG. 2, a data storage system is indicated generally by 100 including a data sub-system 110 comprising one or more data containers 120 which are used in operation by the sub-system 100 for storing one or more volumes of data. Moreover, the sub-system 100 employs thin-provisioning such that data memory associated with the containers 120 is subject to potential over-allocation for rendering a virtual data storage capacity provided by the system 100 larger than its real actual data storage capacity. The system 100 also includes a management controller 160 which is responsible for managing data storage hardware of the sub-system 110, for example its data storage disc drives, solid state data memory and so forth. Moreover, the management controller 160 is operable to control and execute all operations within the sub-system 110, for example for handling external management requests 200 invoked through an external interface 180 of the sub-system 110. Such requests 200 can include, for example, a command line interface (CLI), and can provide all necessary information about a configuration of the sub-system 110 and its status in respect of its internal storage containers 120.

The sub-system 110 additionally includes a data collection and evaluation unit 130, which is responsible for periodically collecting information about the configuration of the one or more containers 120, especially with regard to their data storage capacity key metrics. Moreover, the evaluation unit 130 is provided with it own persistent data store 140 for later evaluation, for example for generating historical data describing utilization of the one or more containers 120 for use in executing extrapolation in respect of future anticipated data storage requirements. Thus, in this manner, data stored in the persistent data store 140 is operable to provide a history of key capacity metrics for the sub-system 110.

Once a request to create a new volume is issued against the system 100 through its management interface 180, the management controller 160 invokes the collection and evaluation unit 130 which is operable to pull data from the data store 140, compute trends, pull in additional information about constraints and best practices from the configuration data store 150 to determine a best-suited container 120 for use in storing one or more new volumes; the constraints concern, for example, maximum over-allocation limits for the containers 120.

Figure 3A:
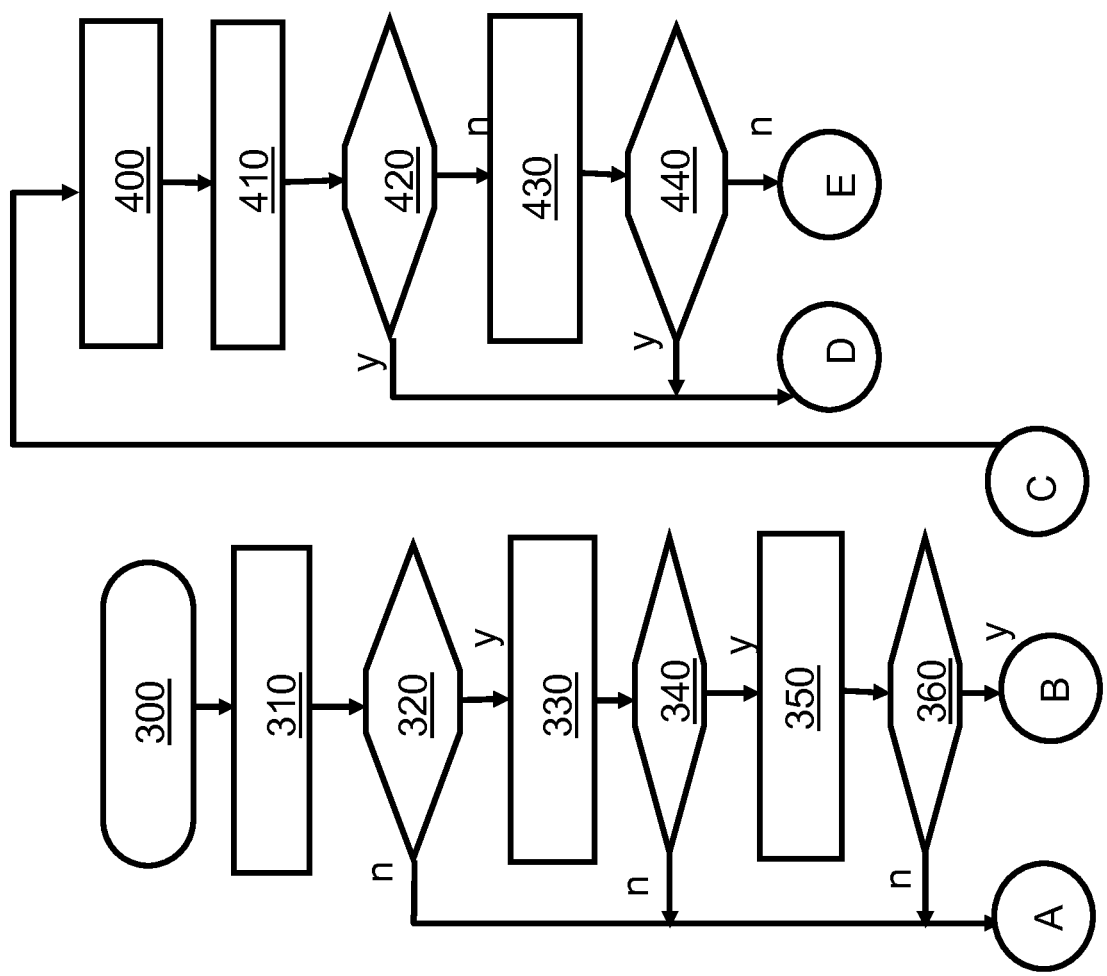
FIG. 3 illustrates is a method employed for operating the system of FIG. 2.
Figure 3B:
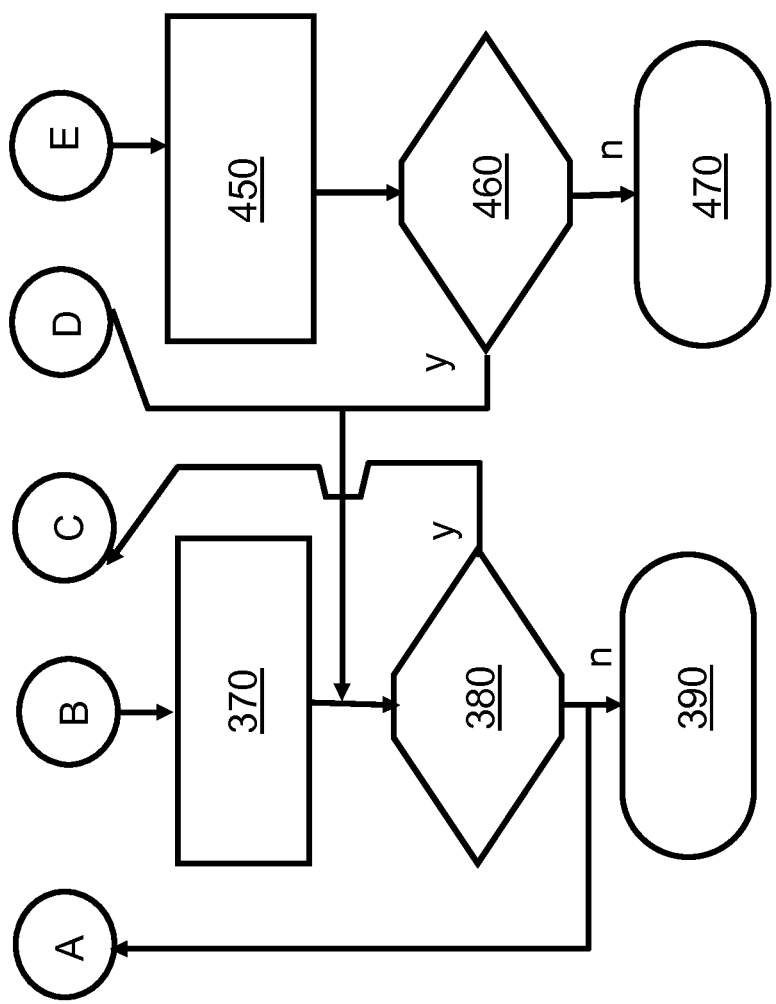

Operation of the system 100 will now be described with reference to FIG. 2, FIG. 3a and FIG. 3b. In FIG. 3a and FIG. 3b, there is shown a flow chart of a method according to the invention. The method in FIGS. 3a and 3b, in order to determine a suitable container to use in the system 100 for storing one or more new volumes, one or more checks have to be undertaken in a list of candidate containers 120 in order to dismiss those containers 120 which do not meet basic requirements for accommodating the one or more new volumes. These one or more checks are performed to determine: (a) whether or not a given container 120 is capable of providing enough virtual space for the requested size of the one or more new volumes, see steps 310, 320 in FIG. 3a; (b) whether or not there is enough real capacity for an initial requested real size of data to be stored; optionally, the system 100 is operable to allow a degree of additional buffer memory capacity to cope with future growth based upon configuration data stored in the configuration data stored 150, see steps 330 and 340 in FIG. 3a; and (c) whether or not a current over-allocation factor is already higher or close to a specified maximum over-allocation factor for the given container 120 based upon configuration data stored in the configuration data stored 150, see steps 350, 360 in FIG. 3a.

After start step 300, in step 310 containers 120 are checked for sufficient virtual space. In step 320 it is checked whether any container 120 has enough virtual capacity. If no container 120 has enough virtual capacity ("n" in the flow chart), the test ends at step 390 as no container 120 is found. If there is one or more containers 120 with enough virtual capacity ("y" in the flow chart) it is continued with step 330 where containers 120 are checked for sufficient starting real capacity. In subsequent step 340 it is checked whether any container 120 has enough real capacity. If no container has enough real capacity ("n" in the flow chart) the test ends at step 390 as no container 120 is found. If any container 120 has enough real capacity ("y" in the flow chart) it is continued with step 350, where the containers 20 are checked for over-allocation. In step 360 it is checked whether any container 120 is below its maximum over-allocation factor. If no ("n" in the flow chart) the test ends at stop step 390 as no container 120 is found.

If yes ("y" in the flow chart) a list of all containers 120 is created which are ordered by distance of over-allocation factor from its maximum value in step 370. From containers 120 in the sub-system 110 which pass tests in (a) to (c), a candidate container 120 list is generated by the method, the list being then subsequently sorted in respect of a degree to which its container 120 current over-allocation factors are away from the maximum over-allocation factor for the containers in the list; this is implemented in step 370. If none of the containers 120 pass such a test pursuant to the present invention ("n" in the slow chart), the method is operable to provide a message in return informing of no suitable container 120 having been found (step 390).

If the list is not empty ("y" in the flow chart), namely one or more candidate containers 120 have been found for which further iteration included in the method can be applied as in step 380, where it is checked whether or not there are more containers on the created list, a container 120 is selected from the list in step 400. For the selected container 120, a hypothetical over-allocation factor is computed in an event that one or more new volumes were to be stored in the selected container 120 in step 410.

Moreover, the hypothetical over-allocation factor is checked against the maximum over-allocation factor for the selected container 120 and a further check is made whether ("y" in the flow chart) or not ("n" in the flow chart) the computed hypothetical over-allocation factor violates best practices as defined by the configuration data stored in the configuration data store 150, namely as provided in steps 410, 420. If this test based upon the hypothetical over-allocation is passed ("n" in the flow chart), a future trend for virtual and real utilization of data memory in the sub-system 110 is computed based upon historical data memory usage data retained in the persistent data store 140. Moreover, assumed values for a specified time-range are calculated, in step 430; in other words, a time is specified for when the one or more new volumes are to be stored, and optionally a time period during which the one or more new volumes need to be stored in the sub-system 110, namely in step 430.

In subsequent step 440 the assumed space is checked against the thresholds defined for the sub-system 110 and best practice values and if there the threshold or best practice values are not exceeded ("n" in the flow chart), the capacity of the one or more new volumes is included in the trend calculation in step 450. The computer values are checked against thresholds defined for the sub-system 110 and best rules for best practices in step 460. If all checks at steps 420, 440, 460 show best practices and thresholds are not violated ("n" in the flow chart), then the selected container 120 is successful and the process ends at step 470. The selected container 120 is the one to be used to accommodate the one or more new volumes. Conversely, in an event that one or more of the checks at steps 420, 440, 460 determine a violation of best practices or thresholds ("y" in the flow chart), the method progresses to consider a next possible candidate container 120 in the aforementioned list.

In conclusion, the present invention is concerned with a task of finding data memory of a data storage sub-system for accommodating one or more new volumes of data, for example to be generated by one or more software applications executing upon computing hardware. The one or more new volumes are to be stored in one or more data containers of the sub-system, wherein the one or more data containers occupy data memory, which is thin-provisioned, namely effectively over-allocated. Such over-allocation needs to be managed to avoid a situation wherein data memory is exceeded in the sub-system such that loss of access or even of data can occur. Moreover, management of data storage resources in the sub-system is subject to various policy rules. In order to improve operation of the sub-system, the present invention concerns a method of identifying one or more eligible containers for storing the one or more new data volumes and generating a list of potentially eligible containers. The method involves:

(a) finding one or more containers which have sufficient virtual data storage capacity;
(b) finding one or more containers which have sufficient real data storage capacity;

(c) finding one or more containers which are below their over-allocation capacity with regard to thin partitioning; and (d) finding one or more containers in respect of (a) to (c) whose data storage utilization does not exceed thresholds and best practice values.

If conditions (a) to (d) are satisfied for a given container in the list, wherein future predictions of real and/or virtual capacity are determined by extrapolating historic values for example, the given container is then adopted for use in storing the one or more new data volumes. The present invention enables data storage capacity in data storage sub-systems to be utilized more efficiently, for example for enabling a larger number of concurrently executing software applications requiring data memory access to be accommodated in the computing hardware, thereby, for example, increasing functionality offered in operation by the computing hardware. The present invention is, for example, distinguished in that it provides a method of placing one or more new volumes based on real storage capacity information, over-allocation information and extrapolated anticipated data storage requirements. By taking all these factors into consideration, more efficient utilization of thin-partitioned data storage memory is possible.

It will be clear to one of ordinary skill in the art that the preferred embodiment of the present invention is industrially applicable in providing advantageous efficiencies in the operation of distributed cluster storage networks. It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, the functional data comprising functional computer data structures to, when loaded into a computer system and operated upon thereby, enable the computer system to perform all the steps of the method. It will be clear to one skilled in the art that many improvements and modifications can be made to the foregoing exemplary embodiment without departing from the scope of the present invention.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of storing one or more volumes of data in a data storage system, including one or more data storage containers, provided by data storage hardware, the one or more data storage containers being thin-provisioned to provide virtual data storage capacity which is greater than a real data storage capacity of the data storage hardware, wherein the method includes:
   identify placement of the one or more volumes of data within the data storage system for fulfilling one or more corresponding storage capacity provisional requests;
   determining a real data storage capacity of the data storage system for accommodating a requested real size of data to be stored on the one or more new volumes;
   determining virtual data storage capacity of the data storage system for accommodating a requested size of data to be stored on the one or more new volumes;
   determining over-allocation information relating to the one or more data storage containers;
   determining extrapolated future anticipated use of the one or more containers of the data storage system from historical data storage use information;
   identifying the one or more containers of the data storage system for the one or more new volumes and generating a list of one or more candidate data storage containers by:
      finding one or more containers which have sufficient virtual data storage capacity for the one or more new volumes,
      finding one or more containers which have sufficient real data storage capacity or the one or more new volumes,
      finding one or more containers which are below their over-allocation capacity with regard to thin partitioning, and
      finding one or more containers in respect to the one or more containers whose data storage utilization does not exceed thresholds and best practice values; and
   selecting the one or more candidate data storage containers on the basis of information from the determining the real data storage capacity, over-allocation information, and the extrapolated future anticipated use.

2. The method of claim 1, further including, selecting one or more candidate containers for the one or more new volumes, based upon results from the determining and the selecting being compared with at least one of one or more data storage thresholds and with policy rules defining operation of the data storage system.

3. The method according to claim 1, wherein information regarding utilization of the data storage capacity of the system is stored in persistent memory for use in selection of the one or more candidate containers for storing the one or more new volumes.

4. The method according to claim 1, wherein operating the distributed cluster storage network comprises operating a storage virtualization controller.

5. An data storage system for storing one or more volumes of data, the system including one or more data storage containers provided by data storage hardware, the one or more data storage containers being thin-provisioned to provide virtual data storage capacity which is greater than a real data storage capacity of the data storage hardware, wherein the data storage system includes at least one of:
   a processor device operable in the data storage system, and
   a memory management arrangement, in communication with the processor device, wherein the processor device and the memory management arrangement is adapted for performing one of:
      identifying placement of the one or more volumes of data within the data storage system for fulfilling one or more corresponding storage capacity provisional requests,
      determining a real data storage capacity of the data storage system for accommodating a requested real size of data to be stored on the one or more new volumes,
      determining virtual data storage capacity of the data storage system for accommodating a requested size of data to be stored on the one or more new volumes,
      determining over-allocation information relating to the one or more data storage containers,
      determining extrapolated future anticipated use of the one or more containers of the data storage system from historical data storage use information,
      identifying the one or more containers of the data storage system for the one or more new volumes and generating a list of one or more candidate data storage containers by:
         finding one or more containers which have sufficient virtual data storage capacity for the one or more new volumes,
         finding one or more containers which have sufficient real data storage capacity or the one or more new volumes,
         finding one or more containers which are below their over-allocation capacity with regard to thin partitioning, and
         finding one or more containers in respect to the one or more containers whose data storage utilization does not exceed thresholds and best practice values, and
      selecting one or more candidate data storage containers on the basis of information from the determining the real data storage capacity, over-allocation information, and the extrapolated future anticipated use.

6. The system of claim 5, wherein the processor device and the memory management arrangement is further adapted for selecting one or more candidate containers for the one or more new volumes, based upon results from the determining and the selecting being compared with at least one of one or more data storage thresholds and with policy rules defining operation of the data storage system.

7. The system of claim 5, wherein information regarding utilization of the data storage capacity of the system is stored in persistent memory for use in selection of the one or more candidate containers for storing the one or more new volumes.

8. The system of claim 5, wherein operating the distributed cluster storage network comprises operating a storage virtualization controller.

9. A computer program product of storing one or more volumes of data in a data storage system, including one or more data storage containers, provided by data storage hardware, the one or more data storage containers being thin-provisioned to provide virtual data storage capacity which is greater than a real data storage capacity of the data storage hardware, a host computer system and a storage subsystem by a processor device, the computer program product comprising a non-transitory computer-readable storage medium having computer-readable program code portions stored therein, the computer-readable program code portions comprising:

a first executable portion for identify placement of the one or more volumes of data within the data storage system for fulfilling one or more corresponding storage capacity provisional requests;

a second executable portion for determining a real data storage capacity of the data storage system for accommodating a requested real size of data to be stored on the one or more new volumes;

a third executable portion for determining virtual data storage capacity of the data storage system for accommodating a requested size of data to be stored on the one or more new volumes;

a fourth executable portion for determining over-allocation information relating to the one or more data storage containers;

a fifth executable portion for determining extrapolated future anticipated use of the one or more containers of the data storage system from historical data storage use information;

a sixth executable portion for identifying the one or more containers of the data storage system for the one or more new volumes and generating a list of one or more candidate data storage containers by:

finding one or more containers which have sufficient virtual data storage capacity for the one or more new volumes finding one or more containers which have sufficient real data storage capacity or the one or more new volumes, finding one or more containers which are below their over-allocation capacity with regard to thin partitioning, and finding one or more containers in respect to the one or more containers whose data storage utilization does not exceed thresholds and best practice values; and a seventh executable portion for selecting one or more candidate data storage containers on the basis of information from the determining the a real data storage capacity, over-allocation information, and the extrapolated future anticipated use.

10. The computer program product of claim 9, further including an eighth executable portion for selecting one or more candidate containers for the one or more new volumes, based upon results from the determining and the selecting being compared with at least one of one or more data storage thresholds and with policy rules defining operation of the data storage system.

11. The computer program product of claim 9, wherein information regarding utilization of the data storage capacity of the system is stored in persistent memory for use in selection of the one or more candidate containers for storing the one or more new volumes.

12. The computer program product of claim 9, wherein operating the distributed cluster storage network comprises operating a storage virtualization controller.

\* \* \* \* \*